Dec. 25, 1923.
J. T. TILLMAN
1,478,993
COMBINATION TOOL AND GRINDER
Filed April 1, 1921   2 Sheets-Sheet 2
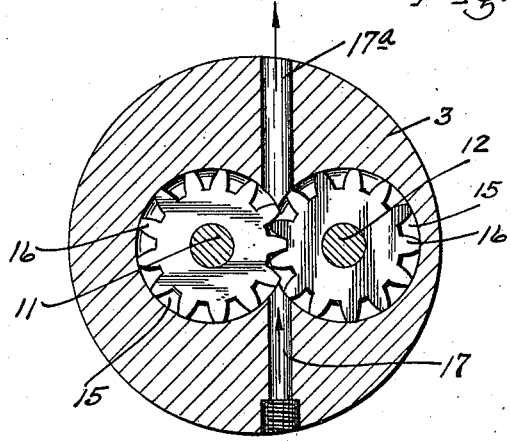
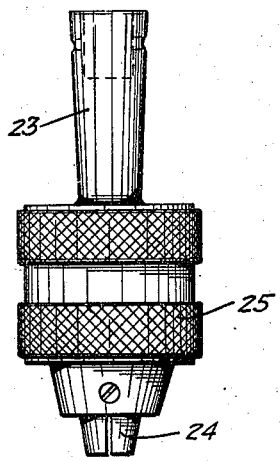
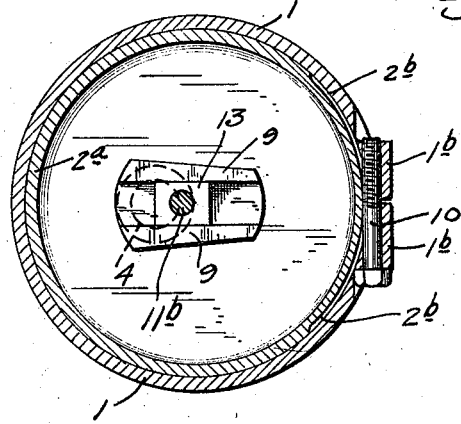
INVENTOR
Joseph T. Tillman
BY HIS ATTORNEY
James F. Williamson Patented Dec. 25, 1923.

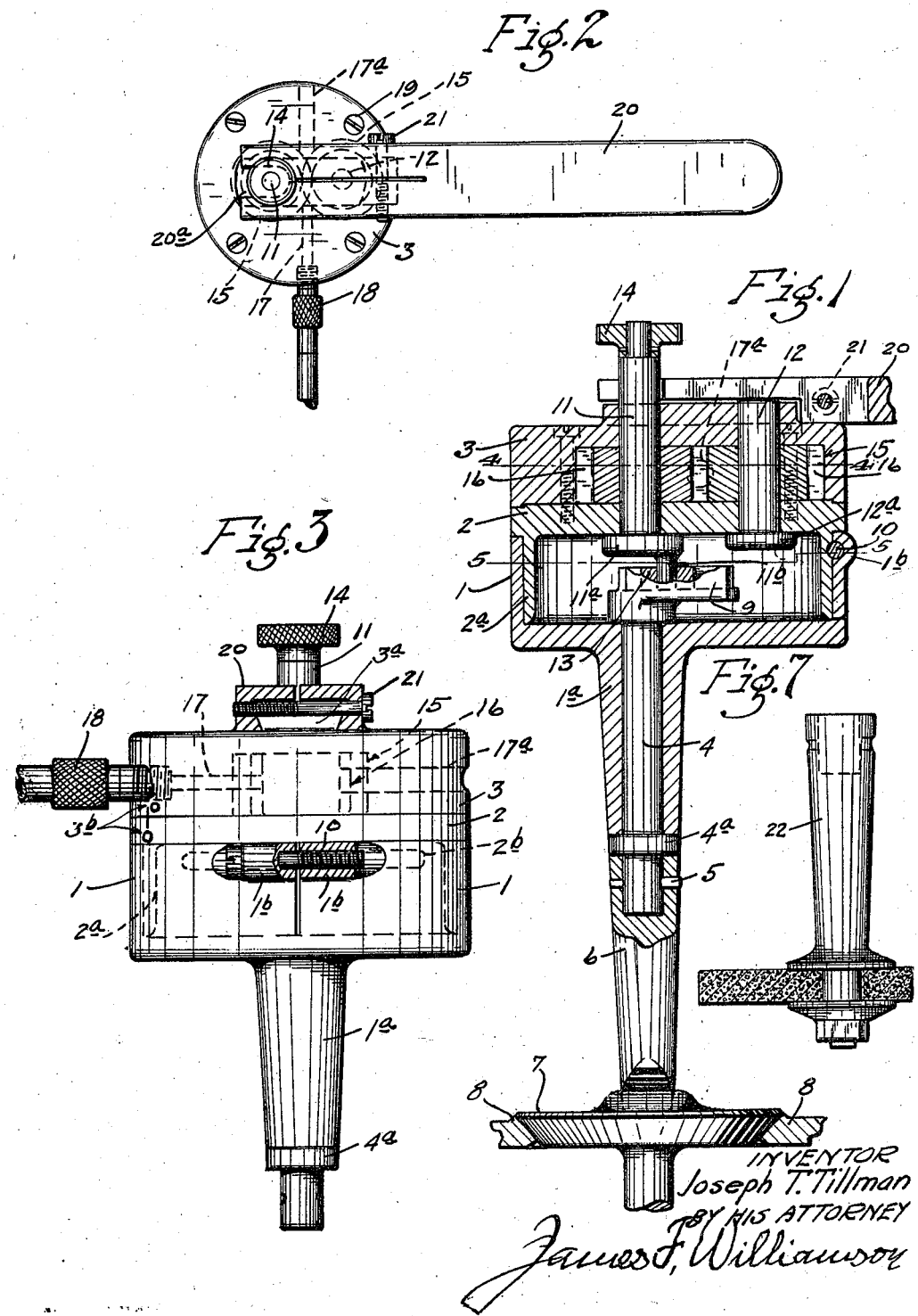

1,478,993

UNITED STATES PATENT OFFICE.

JOSEPH T. TILLMAN, OF MINNEAPOLIS, MINNESOTA, ASSIGNOR TO (MRS.) GUSTAVE F. KRIESEL.

COMBINATION TOOL AND GRINDER.

Application filed April 1, 1921. Serial No. 457,597.

*To all whom it may concern:*

Be it known that I, JOSEPH T. TILLMAN, a citizen of the United States, residing at Minneapolis, in the county of Hennepin and State of Minnesota, have invented certain new and useful Improvements in Combination Tools and Grinders; and I do hereby declare the following to be a full, clear, and exact description of the invention, such as will enable others skilled in the art to which it appertains to make and use the same.

This invention relates to a combination tool, and particularly to such a tool which is of great utility in connection with automobiles.

It is an object of this invention to provide a hand tool equipped with a small compact and convenient motor which can be used to grind and reseat valves of the automobile engine or which can be used as a drill or provided with a grinding wheel and used to finish or grind any desired parts.

It is a further object of the invention to provide such a tool with an operating spindle and mechanism for turning the same by which the spindle can either be continuously rotated or be oscillated to form what is known as a "wiggler."

It is also an object of the invention to provide the tool with a detachable handle by which it can be manipulated for various operations, which handle is readily removable. The tool proper is provided with handle attaching means which, when the handle is not in place, is suitable for attaching the same to a lathe when it is desired to use the tool for grinding the lathe centers.

These and other objects of the invention will be apparent from the following description made in connection with the accompanying drawings in which like reference characters refer to the same parts throughout the different views, and in which—

Fig. 1 in the most part, is a central longitudinal section through the device, showing the same as a valve grinding tool in engagement with a valve;

Fig. 2 is a top plan view of the tool with the handle attached shown on a reduced scale;

Fig. 3 is a view in side elevation of the tool as seen from the right of Fig. 2, some parts being shown in section;

Fig. 4 is a transverse section of the device taken on the line 4—4 of Fig. 1; and Fig. 5 is a similar section taken on the line 5—5 of Fig. 1;

Fig. 6 is a view in elevation of a drill chuck adapted to be used with the tool; and Fig. 7 is a view of the grinding wheel adapted to be used with the tool.

Referring to the drawings, the device comprises a casing formed with a bottom part 1, an intermediate part 2 and a top part 3. The bottom part 1 has tapered spindle on arm $1^a$ projecting from the lower portion thereof which is suitably bored to receive a spindle 4 which is journaled therein and provided with a collar $4^a$ which bears against the end of the portion $1^a$. The spindle 4 has a short projection beyond the collar $4^a$ which has a transverse aperture therethrough adapted to receive a key or cotter pin 5 of any desired type. The spindle is adapted to receive different types of tools, such as the valve engaging tool 6 shown in Fig. 1, which is equipped with a flat tang at its outer end to engage in the groove commonly formed in an engine valve shown as 7 in Fig. 1. This valve is shown in contact with its seat 8. The body of the casing 1 is cylindrical and hollow and a member 9 formed as a slotted crank has a cylindrical hub member bearing upon the bottom of the casing and rigidly secured to the inner end of the spindle 4. The intermediate casing has a cylindrical extension or sleeve $2^a$ of a size to fit snugly inside of the casing 1, as shown in Figs. 1 and 5.

The casing 1 is provided at one side with a lug $1^b$ and is split therethrough. This lug is bored and also tapped at one side to receive a clamping bolt 10. The bore in the bolt 10 extends slightly into the side of the extension $2^a$ of the casing 2 and this portion $2^a$ is formed with a circumferential groove $2^b$ in which the bolt 10 is received. This sleeve $2^a$ can thus be rotated in the casing 1 until the ends of said slot $2^b$ contact with the bolt 10. The sleeve $2^a$ can also be clamped in the casing 1 by tightening the bolt 10. The top of casing member 2 is provided with two bores or apertures in which are journaled shafts 11 and 12. These shafts extend upwardly through similar bores in the top or outer portion of the casing member 3. The shaft 11 is provided at its inner end with a collar 11ª which bears against the outer side of the casing 2, and from the other side of which a crank pin 11ᵇ projects eccentrically to the shaft 11, which pin is arranged to project into a block member 13 which is slidable in the groove in the cam member 9. The shaft 11 at its outer end is provided with a small knurled head 14 which is pinned, or otherwise suitably secured thereto. The shaft 12 is provided at its inner end with a collar portion 12ª which bears against the inner side of the casing member 2, and the outer end of this shaft is flush with the outer surface of the casing member 3. The casing member 3 is provided with two cylindrical recesses 15 adjacent and communicating with each other in which are fitted two small spur gears 16, the outer diameter of said gears being substantially the same as that of the recesses 15. A transverse bore or aperture 17 extends into the member 3 and communicates with the apertures 15 at the junction thereof. The outer end of this aperture 17 being enlarged and tapped to receive a supply pipe or valve connection. A similar but somewhat larger aperture 17ª extends from the other side of member 3 in alinement with the aperture 17. A valve member 18 is connected in the side of the casing 3 and provided with a knurled control sleeve by which the entrance of fluid into the member 3 can be accurately regulated. This valve is adapted to be attached to a fixed or other pipe leading to a suitable fluid supply. The gears 16 are rigidly secured to the shafts 11 and 12, respectively.

The casing 3 is secured to the intermediate casing 2 by a plurality of spaced screws 19, the heads of which are countersunk to lie flush with the top of said casing. The casing has a projection 3ª on its outer surface, of dove-tailed shape in cross section and a handle member 20 has one end recessed to fit thereover, which end is longitudinally split and provided with a clamping screw 21. The outer end of the handle 20 is also provided with a slot 20ª to enable it to pass around the shaft 11. It will be obvious that the handle 20 may be clamped to the portion 3ª by the screw 21 and may be readily detached therefrom by loosening the screw.

The casing members 1 and 2 are provided with marks 3ᵇ on their outer surfaces which are designated by the numeral zero for a purpose to be hereinafter described.

In lieu of the valve engaging tool 6, the spindle 4 can be equipped with a grinding wheel, such as shown at 22 in Fig. 7, or the same can be equipped with a drill chuck, such as shown at 23 in Fig. 6. This chuck is of well known type provided with jaws 24 and a jaw adjusting and clamping head 25.

The operation of the device is as follows:

If it is desired to use the tool as a drill grinding device, or for some other purpose, requiring constant rotation, the casing members 1 and 2 will be arranged as shown in Fig. 3, with the zero marks thereon in alinement. In this position, the shaft 11 will be alined axially with the shaft or spindle 4. Fluid is now admitted by the valve 18 and this will act on the gears to turn the same and form a motor, the shafts 11 and 12 turning in their bearings in the casing 2 and 3. Movement will thus be given the shaft 11 which will be transmitted through the crank members 11ᵇ and 9, to the spindle 4, and as this spindle and shaft 11 are in alinement, the spindle 4 will be constantly rotated. It will be apparent that the tool can then be used for drilling in any desired place or for a grinding or other operation. If it now be desired to use the tool as a wiggler or oscillating tool to grind the valves of an automobile or other engine, the casing 2 will be moved circumferentially of the casing 1 and the shafts 11 and 4 thus moved out of alinement. The relative motion of the casing can, of course, be given by loosening the screw 10. When the tool is now driven the shaft 4 will not be rotated through the crank connection but will be merely oscillated, such oscillating movement is desirable in grinding valves and for some other operations. As above stated, the slot 2ᵇ in sleeve 2ª will limit the relative turning movement of the casing members 1 and 2, but this relative movement can be regulated as desired and the members clamped, as also stated, by the screw 10. The gears and spindle 4 can be turned manually, if desired, by turning the head 14.

While the tool has been shown as equipped with a fluid motor, it is within the scope of this invention to equip the same with an electric motor, if so desired. From the above description, it is clear that applicant has produced a very simple, compact and efficient tool and one which has a wide range of utility. The parts thereof are quite rugged and simple and have no tendency to become disarranged.

It will, of course, be understood that various changes may be made in the form, details and arrangement of the device without departing from the scope of applicant's invention, which, generally stated, consists in the matter shown and described and set forth in the appended claims.

What is claimed is:

1. A tool of the class described having in combination a casing, a spindle journaled therein, a driving crank for said spindle, and an adjustable connection between said driving crank and spindle whereby said spindle can be either rotated or oscillated.

2. The structure set forth in claim 1, said adjustable connection comprising a pin on said crank, and a crank on said spindle having a slot in which said pin fits and by which said last named crank is turned.

3. A tool of the class described having in combination a casing, an operating spindle journaled therein, a driving shaft, and a connection between said shaft and spindle, said shaft and spindle being relatively adjustable into concentric or eccentric position.

4. A tool of the class described having in combination a hollow casing, an operating spindle journaled therein and projecting therefrom, a slotted crank member secured to the inner end of said spindle in said casing, a block slidable in the slot in said crank member, a casing fitting into said first named casing and having a shaft journaled therein having a crank secured thereto carrying a pin disposed and rotatable in said block, said casings being angularly adjustable.

5. A tool of the class described having in combination a casing having a hollow portion, an operating spindle journaled in said portion, a slotted crank secured to said spindle adapted to rotate in said portion, a block slidable in said crank member, said casing having another portion received in said hollow portion and circumferentially movable, a driving shaft journaled in said last mentioned portion, said shaft having a crank pin extending eccentrically therefrom into the said hollow portion and engaging in said block, whereby the two portions of the casing may be movable relatively to bring the driving shaft and spindle into or out of axial alinement.

6. A tool of the class described comprising a casing having two parts, an operating spindle journaled in one of said parts and projecting therefrom at one side, said spindle being adapted to receive a plurality of different tools, driving means for said spindle journaled in the other part of said casing, and movably connected to said spindle, the parts of said casing being relatively movable to convert the driving means into a rotating means for said spindle or an oscillating means for said spindle.

In testimony whereof I affix my signature.

JOSEPH. T. TILLMAN.